May 22, 1934. C. BERGMANN 1,959,330
AUTOMOBILE SIGNALING DEVICE
Filed Aug. 7, 1928 2 Sheets-Sheet 1
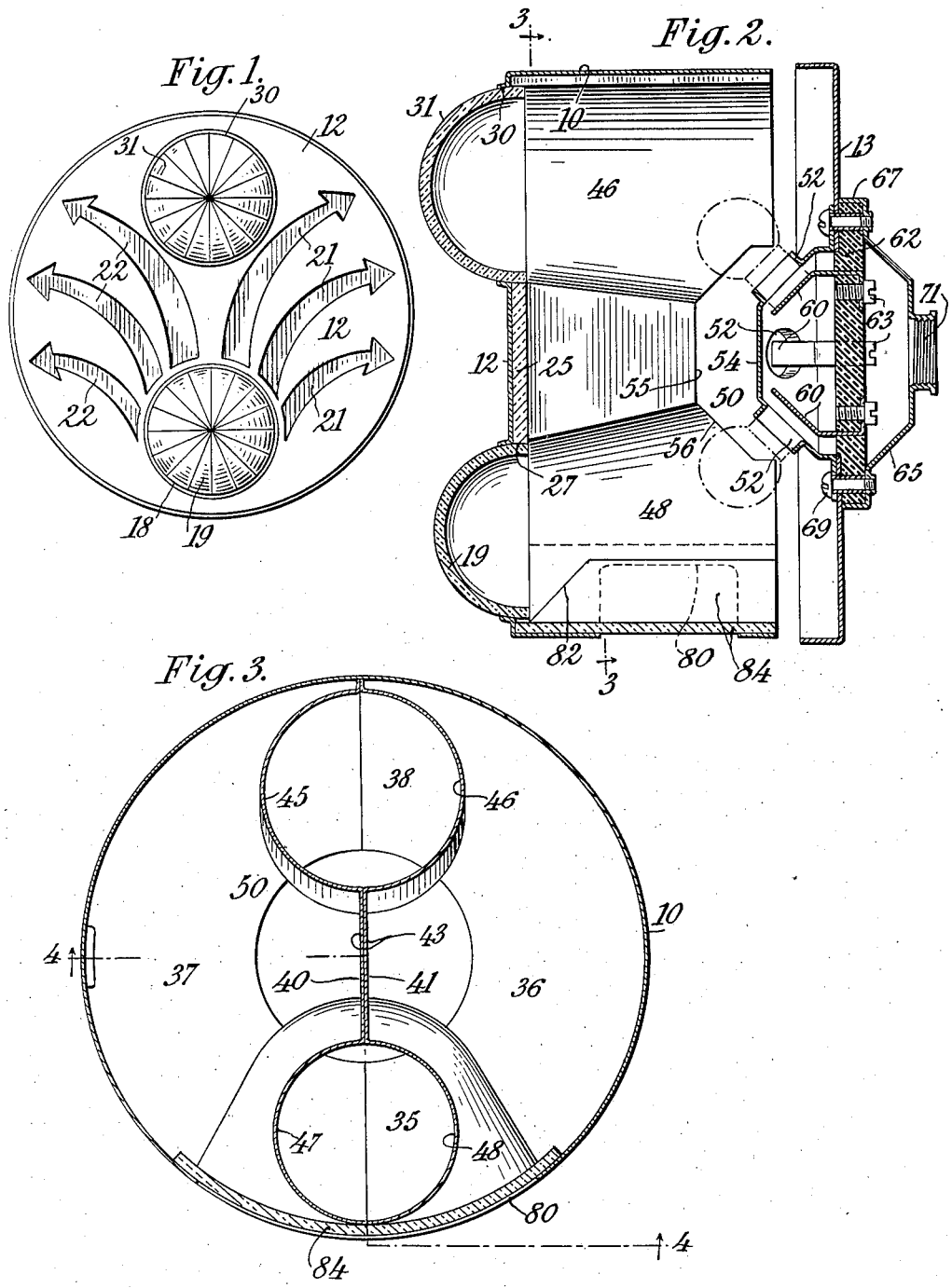

May 22, 1934. C. BERGMANN 1,959,330
AUTOMOBILE SIGNALING DEVICE
Filed Aug. 7, 1928 2 Sheets-Sheet 2
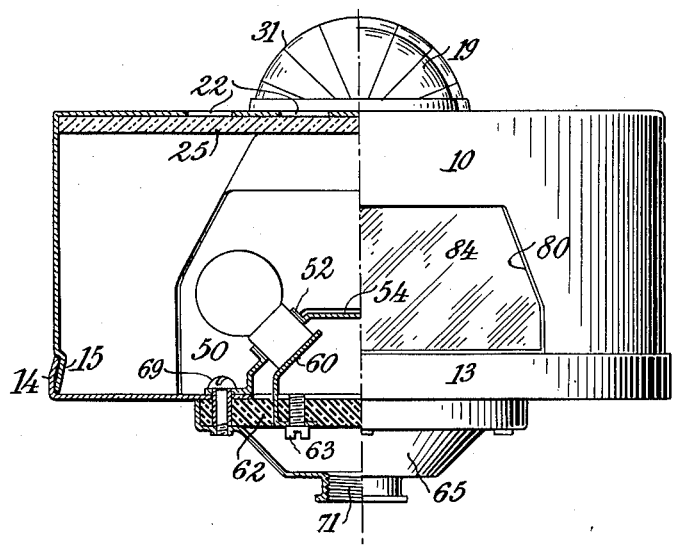
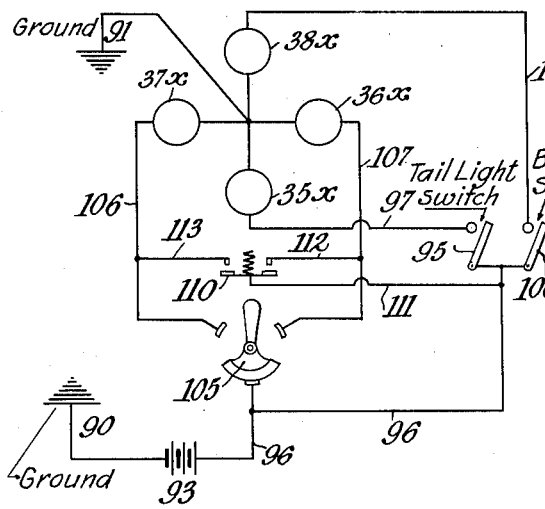
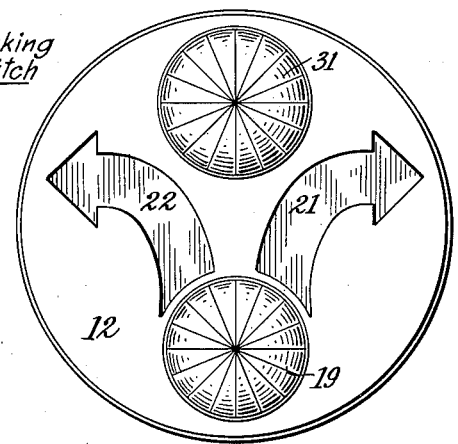
Carl Bergmann INVENTOR
BY
Gustave R. Thompson
ATTORNEY Patented May 22, 1934

1,959,330

UNITED STATES PATENT OFFICE 1,959,330

AUTOMOBILE SIGNALING DEVICE

Carl Bergmann, Bloomfield, N. J., assignor of one-half to Gustave R. Thompson, New York, N. Y.

Application August 7, 1928, Serial No. 297,944

1 Claim. (Cl. 177—327)

This invention relates to a signaling device for automobiles and the like, and provides improvements therein.

The invention provides a device of great simplicity adaptable for mass production, and functioning to give turn signals, stop signals, parking lights, and also as a tail light and license plate illuminator, and conveniently also as a backing and signal light. The construction and assembly of the parts are simple and easy. The device is compact. The replacement of lamps is made very simple and easy. The mounting is simple. Moreover, the operation of the turn and stop signals are arresting and convey a clearly intelligible indication of the kind of signal intended.

An embodiment of the invention is illustrated in the accompanying drawings, wherein:

Figure 1 is a rear view (in elevation) of the device.

Fig. 2 is an enlarged vertical section of the device shown in Fig. 1.

Fig. 3 is a sectional view on the line 3—3, Fig. 2.

Fig. 4 is a bottom view, partly in section and partly in plan, the section being on the line 4—4, Fig. 3.

Fig. 5 is a view similar to Fig. 1 showing a modification.

Fig. 6 is a diagrammatic view illustrating the wiring arrangement.

Referring to said drawings, numeral 10 indicates the casing having front and rear portions, 12, 13. The casing 10 together with its front portion 12 (which faces rearwardly of the vehicle) is conveniently formed as a drawn shell, and the rear portion 13 is conveniently formed as a detachable cover, being conveniently formed as a shallow drawn shell having an inside diameter or size corresponding to and fitting over the edge portion of the casing 10. An indented portion 14 of the rear cover sprung into a recessed portion 15 of the casing (Fig. 4) serves as a means for holding the cover and casing together. Any other suitable means may be provided.

The front portion 12 of the casing has openings or windows therein through which the light signals are made visible at the rear of the vehicle. An opening 18 is provided for the ordinary tail light carried by automobiles. This opening 18 is preferably located in the centerline portion of the casing and preferably adjacent to the lower portion of the casing. A cover of red glass 19, as is customary, covers the tail light opening 18.

For turn signals, the portion 12 of the casing is provided with a plurality of elongated openings 21, 22 pointing to right and left, preferably extending radially from the tail light opening 18, and preferably curved. The openings 21, 22 preferably converge toward their outer ends, and may be provided with arrow heads in order to make very intelligible the function thereof as pointers indicating a right or left turn. Moreover, the number is so chosen that the light through the said openings is clear and distinct at a distance, three as here shown in Fig. 1, giving an indication, which has been found to be clear and intelligible to a following driver.

The turn signals may each comprise a single opening 21, 22, either curved or straight.

These turn signal openings 21, 22 extend from the permanently illuminated tail light 19 and extend upward, and outward, and are preferably curved. Turn signals through illuminated openings of this character have been found to be peculiarly intelligible and effective in conveying the intended signal to a following car.

The openings 21, 22 are preferably covered with a piece of colored glass 25, as for example a piece of green or yellow covered glass, and the piece of glass 25 is conveniently cut the size of the casing, fitting against the inside of the front portion 12 of the casing, suitable openings 27, however, being made in the piece of glass 25 in order to admit of pieces of glass of other color, as for example the colored glass 19, to cover other openings.

In the space on the face of the front portion 12 of the casing, between the diverging openings 21, 22, there may, if desired, be provided an opening 30 for any other signal, as for example a backing signal and light. The opening 30 may, as is customary, be covered with a white colored piece of glass 31.

Means are provided for partitioning the casing in such manner as to provide separate light compartments or spaces behind each of the signals, here shown as faces or compartments 35, 36, 37, 38 (Fig. 3). The partition preferably consists of a pair of sheet metal plates 40, 41, having their middle portions 43 contiguous, and their end portion or portions 45, 46, 47, 48 spread apart or separated to form between them the compartment or compartments 35 and 38. The end portions 45, 47, 46, 48 are preferably formed by embossing the sheets 40, 41, the embossed sheets 40, 41 having the relation of enantiomorphic stampings, and conveniently providing spaces or compartments of generally conical form.

The rear cover preferably carries a rosette 50 provided with a plurality of spaced sockets 52 for incandescent lamps 35x, 36x, 37x, 38x corresponding to compartments 35, 36, 37, 38. The spacing of the lamp sockets is such that each one enters one of the spaces or light compartments 35, 36, 37, 38 of the lamp casing, and the rosette preferably is formed with tapering faces, on which faces the said sockets 52 are formed. This provides for a compact arrangement of the sockets; also for a good positioning of the lamps in the several spaces or compartments 35, 36, 37, 38.

The rosette 50 is preferably attached to the rear cover 13 of the casing. This construction provides for maximum accessibility of the lamps for purposes of replacement, etc. By separating the casing from the cover on which the rosette is mounted, all encumbrances of the lamps are removed, and lamps may be removed and replaced in the sockets without any difficulty whatever.

The rosette 50 preferably comprises a frusto-conical embossed piece of sheet metal 54, which projects inwardly of the casing. The middle portion 55 of the partition sheets 40, 41 and parts 56 of the embossed portions 45—48 are cut away, the cut out portion being of a shape corresponding to the exterior of the rosette, whereby when the rear cover 13 is connected to the casing 10, the inwardly projecting rosette 50 fits into the said cut away edges 55, 56 of the partition plates 40, 41. 60 designates a plurality of electrical contacts, located in proximity to each of the lamp sockets 52, and adapted to contact with a terminal of the lamp filament, when a lamp is placed in the socket. These contacts 20 are conveniently mounted upon an insulating sheet 62 of a phenolic condensation product or similar material, binding screws 63 being provided in conjunction with each of the spring contacts for connecting electrical conductors thereto.

The back of the rosette is preferably closed by an embossed plate 65, the two embossed plates 54, 65 including between them the said insulating plate 62, and conveniently also a flange 67 on the cover 13, screws or rivets 69 joining the plates 50 and 65, and connecting as a unit the said rosette and cover plate 13.

The plate 65 is preferably provided with means 71 for supporting the lamp, this means being conveniently a threaded opening which screws upon a supporting arm which is conveniently made hollow, and thereby serves as a conduit for leading the wires, for lighting the lamps, through the one opening 71 to the binding screws 63 on the said insulating plate 62.

The under side of the casing is preferably provided with an opening 80 adapted to illuminate the customary license plate. This opening 80 conveniently opens into the compartment 35 which is lighted by the lamp used for the tail-light signal. To this end, the embossed portions 47, 48 of the plates 40, 41 are conveniently spread and cut away, as indicated at 82, so as to conform to the contour of the inside of the casing and at the same time expose the said opening 80 to the light in the said space 35. The opening 80 is conveniently covered with a piece of transparent glass, celluloid or the like, 84, which rests against the inside of the casing over and around the opening 80, and the partition plates 40, 41 are preferably arranged so as to press upon the said transparent cover 84 so as to hold the same in place. It will therefore be seen that the partition plate 40, 41 not only act to subdivide the space within the lamp casing but also serve as means for holding in place the glass plates 25 and 84.

*Operation*

The wiring connections, and the switches for operating the signals are shown diagrammatically in Fig. 6.

The battery and the lamp sockets are preferably grounded, as indicated at 90, 91, Fig. 5. 93 indicates a source of current, as the ordinary storage battery.

The tail light is illuminated by admitting current to the lamp 35x, by means of switch 95 and conductors 96, 97.

A backing signal and light are illuminated by closing the backing switch 100, thereby admitting current to the lamp 38x over the conductor 96 and conductor 101.

To give a turn signal, a switch 105 is provided.

To make a left turn, the switch 105 is turned so as to admit current through the conductors 96, 106 to the lamp 37x, to thereby illuminate the openings 22 in the left side of the portion 12 of the casing, which indicate or signal a left turn.

To make a right turn, the switch 105 is turned so as to lead current to the lamp 36x, over the conductors 96, 107, the lamp 36x illuminating the openings 21 in the casing, and thereby indicate or signal a right turn.

To indicate or signal a stop (or caution), a switch 110 is actuated to lead current to both of the lamps 36x, 37x, so as to simultaneously illuminate the openings 21, 22, current flowing to said lamps 36x, 37x over conductor 96, branch 111, branches 112, 113 and conductors 106, 107. The switch 110 is conveniently connected to a part of the brake mechanism, so as to be actuated by the foot-pedal in applying the brakes, as is usual in the operation of stop signals.

The invention may receive other embodiments than that herein specifically illustrated and described.

What is claimed is:

A device of the character described, comprising a lamp casing having signal lenses in the face of the casing exposed to view, and comprising substantially circular lenses in the lower and upper parts respectively of, and in the vertical axis of, said casing, upwardly and outwardly curved arrow-like windows on each side of said vertical axis generated from said lower lens, said arrow-like windows lying closely adjacent said upper lens and each other for the portion of their length between said lenses, and a partition in the vertical axis of said casing comprising a pair of enantiomorphically embossed plates, said plates together forming cylindrical tubes in line with said axial lenses, and having a mid-portion along said vertical axis.

CARL BERGMANN.